United States Patent
Batistic et al.

(10) Patent No.: US 6,580,995 B1
(45) Date of Patent: Jun. 17, 2003

(54) METHOD AND DEVICE FOR RECOGNIZING CORNERING AND FOR STABILIZING A VEHICLE IN CASE OF OVER-STEERED CORNERING

(75) Inventors: Ivica Batistic, Frankfurt am Main (DE); Holger Schmidt, Wettenberg (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 09/601,704
(22) PCT Filed: Feb. 3, 1999
(86) PCT No.: PCT/EP99/00689
§ 371 (c)(1), (2), (4) Date: Feb. 21, 2000
(87) PCT Pub. No.: WO99/39953
PCT Pub. Date: Aug. 12, 1999

(30) Foreign Application Priority Data

| Feb. 7, 1998 | (DE) | 198 04 941 |
| Feb. 7, 1998 | (DE) | 198 04 956 |
| Feb. 7, 1998 | (DE) | 198 04 953 |
| Mar. 14, 1998 | (DE) | 198 11 149 |
| Jul. 20, 1998 | (DE) | 198 32 484 |

(51) Int. Cl.$^7$ ............................................. B60T 8/24
(52) U.S. Cl. ................................................... 701/72
(58) Field of Search ............... 701/36, 41, 70–76, 701/78–80, 82–83, 90–93; 303/163–169, 171–176, 153; 180/197, 410, 411, 446, 421–423

(56) References Cited

U.S. PATENT DOCUMENTS

| 5,272,636 A | * 12/1993 | Buschmann et al. .......... 701/72 |
| 5,490,070 A | * 2/1996 | Kiryu et al. ................... 701/70 |
| 5,691,900 A | * 11/1997 | Luckevich ..................... 701/41 |
| 6,023,649 A | * 2/2000 | Matsuura et al. .............. 701/71 |
| 6,044,320 A | * 3/2000 | Stuible et al. ................. 701/72 |
| 6,052,643 A | * 4/2000 | Batistic ........................ 701/72 |

FOREIGN PATENT DOCUMENTS

| DE | 34 46 002 | 6/1985 |
| DE | 34 13 738 | 10/1985 |
| DE | 34 21 732 | 12/1985 |
| DE | 36 11 822 | 10/1986 |
| DE | 39 05 045 | 8/1990 |
| DE | 39 33 653 | 4/1991 |
| DE | 40 08 167 | 9/1991 |
| DE | 40 31 707 | 4/1992 |
| DE | 43 38 587 | 5/1994 |
| DE | 43 17 050 | 11/1994 |
| DE | 44 29 242 | 2/1995 |
| DE | 44 18 771 | 10/1995 |
| DE | 44 18 773 | 1/1996 |
| DE | 195 10 104 | 8/1996 |
| DE | WO97/00798 | * 1/1997 | ............ B61T/8/00 |
| DE | 195 22 632 | 1/1997 |
| DE | 195 22 634 | 1/1997 |
| DE | 196 07 185 | 8/1997 |
| DE | 196 23 596 | 12/1997 |
| DE | 196 28 971 | 1/1998 |
| DE | 196 38 280 | 3/1998 |
| DE | 197 46 889 | 5/1998 |
| GB | 13 53 717 | 5/1974 |
| JP | 1 121760 | 5/1989 |

* cited by examiner

Primary Examiner—Thu Nguyen
(74) Attorney, Agent, or Firm—Rader, Fishman & Grauer PLLC

(57) ABSTRACT

Methods and devices for detecting cornering and in particular over-steered cornering, as well as a method and a device for stabilizing a vehicle in case of an over-steered cornering maneuver are described. The detection can be carried out with reference to wheel slip values and/or transverse acceleration values. The stabilization is carried out upon detection of the over-steered cornering maneuver by means of suitable interventions in the brake system.

13 Claims, 7 Drawing Sheets

Fig. 7
a) 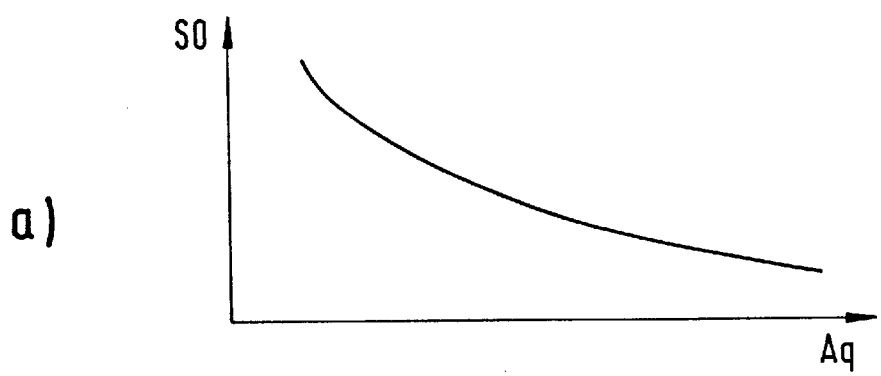
b) 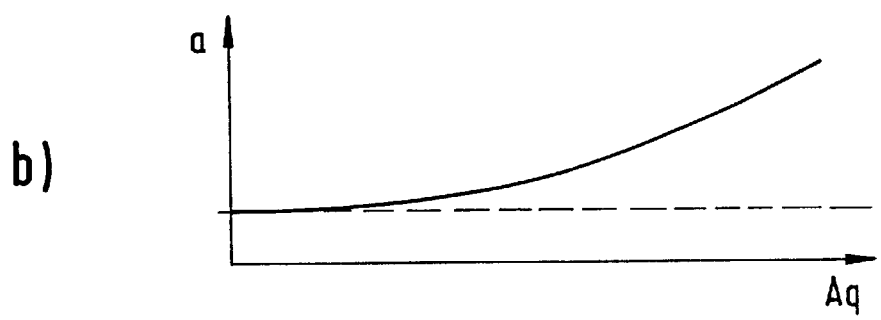
c) 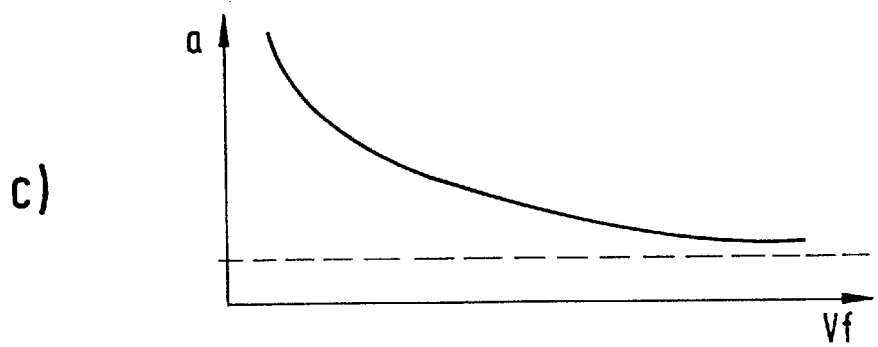
d) 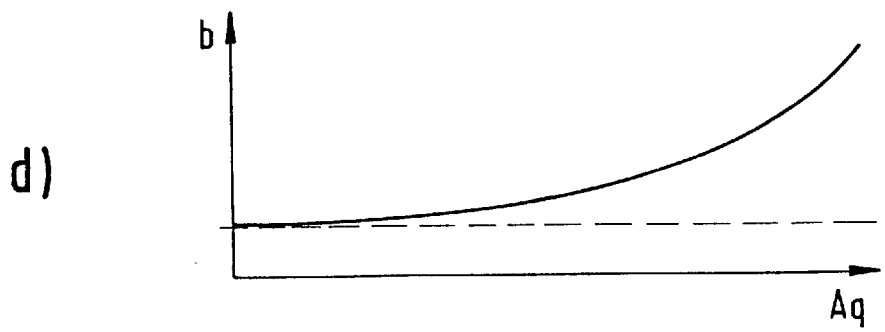

METHOD AND DEVICE FOR RECOGNIZING CORNERING AND FOR STABILIZING A VEHICLE IN CASE OF OVER-STEERED CORNERING

TECHNICAL FIELD

The present invention relates to a method and a device for recognizing cornering, especially over-steered cornering, and for stabilizing a vehicle in case of over-steered cornering.

BACKGROUND OF THE INVENTION

A cornering maneuver can be recognized by different sensors, for example, steering angle sensors or transverse acceleration sensors, but the additional expenditure for the sensors also increases the expenditure for the cabling, the costs and the failure probability. Thus, there are applications in which it is desirable that cornering be detected without additional sensors. By the way, it is often difficult to recognize over-steered cornering, which is understood as a cornering maneuver in which the vehicle turns into a curve around its vertical axis to an extent exceeding the extent that would be necessary or, more generally speaking, in which a vehicle drives to the outer side of the curve with its tail. In the extreme case, we are talking about a swerving car in the broadest sense of the word. The present invention considers in particular also the extreme cases in which an over-steering exists only to a relatively small extent, for example, at the beginning of the vehicle's swerving. It is difficult to recognize an over-steered cornering maneuver just in these cases so that the over-steered behavior is increasing slowly until finally the vehicle is completely unstable. Conventional methods for recognizing over-steered cornering are not very useful due to the limited transverse dynamics in the limit range, so that the response thresholds for stabilizing interventions are not reached. Thus, a stabilizing brake intervention, which in principle would be possible, is omitted due to the lacking or delayed recognition of the over-steered cornering maneuver.

SUMMARY OF THE INVENTION

It is the object of the present invention to provide methods and devices for recognizing cornering, especially over-steered cornering, as well as for stabilizing a vehicle during an unstable cornering maneuver, which are sensitive, reliable and manage without additional expenditure for sensors, if necessary.

Before describing single embodiments of the invention, basic relations of a vehicle in which the present invention can be applied are illustrated with regard to FIG. 1 and FIG. 2. FIG. 1 schematically shows a vehicle. Reference numerals 101 to 104 are the wheels of the vehicle, reference numeral 101 being the left front wheel, reference numeral 102 the right front wheel, reference numeral 103 the right rear wheel and reference numeral 104 the left rear wheel. Reference numeral 105 is the front axle, reference numeral 106 the rear axle. Reference numerals 111 to 114 are the wheel sensors detecting the wheel speed of the single wheels, particularly the rotating speed. Reference numerals 121 to 124 symbolize the wheel brakes. The output signals of the wheel sensors 111 to 114 are transmitted to a control 130. Furthermore, the control can also receive signals of additional sensors 115 to 117. In addition, the control 130 produces output signals 131 with which the longitudinal dynamics and/or the transverse dynamics of the vehicle can be influenced. Thus, they produce in particular signals for the wheel brakes 121 to 124 in order to adjust the brake pressure. In addition, signals can be produced which influence the driving torque and, if necessary, also the automatic transmission.

If a vehicle drives around a corner transverse forces (with regard to the longitudinal axis of the vehicle) have to be produced counteracting on the one hand to the centrifugal force resulting from cornering, and on the other hand to the moment of inertia of the vehicle itself during steering. The wheels transmit these forces to the vehicle. If the vehicle is stable the transverse forces resulting from this process can be transmitted by means of the static friction between roadway and tire. If the vehicle is unstable and in particular if it is over-steered, the transverse forces that are actually necessary are bigger than the forces that can be transmitted due to the static friction between roadway and wheels.

FIG. 2 describes the case that might appear in an over-steered left-hand curve. In FIG. 2, the left front wheel is shown. The same reference numerals as in FIG. 1 indicate the same components. Reference numeral 111 is the wheel sensor, reference numeral 111a is a marking disc which follows the wheel 101 and helps determining the rotating speed of the wheel 101. The speed of the wheel (and vehicle as described below) on the roadway is marked Vf. It is not oriented parallel to the wheel plane (vertical to the wheel axis) but extends at an angle, α, to the wheel plane. FIG. 2 shows the case of a wheel that is not braked. In this case, it can be assumed that the speed of the wheel in the wheel plane (vertical to the wheel axis) corresponds to the speed component of the wheel on the roadway (because the wheel can freely roll). As a result, the vehicle speed, Vf, can be determined from the vectorial addition of the longitudinal component, Vl, and the transverse component, Vq. More specifically, if there is a difference between the vehicle speed Vf and the longitudinal component, Vl (detected by the wheel sensors), then the difference can be attributed to a transverse component, Vq. This is valid both for the vectorial approach as also for the approach by the absolute amount.

Furthermore, it was established that during each cornering (i.e. ultimately also if a cornering maneuver is considered as stable) there is a transverse component—even if it is small—so that during each cornering, whether stable or over-steered, a transverse component is produced. Thus, a speed difference between the vehicle speed, Vf, and the longitudinal component, Vl (slip). The slip (difference between vehicle speed, Vf, and longitudinal component, Vl, or the difference between their absolute amounts) can be produced on different wheels, according to the driving situation.

According to the present invention, cornering is determined with reference to several slip values on several vehicle wheels. Also, an over-steered cornering maneuver can be determined with reference to several slip values on several vehicle wheels. According to the present invention, over-steered cornering can also be determined with reference to the transverse accelerations of the vehicle axles. According to another aspect of the present invention, over-steered cornering can be determined in a particularly reliable way if the determination based on the wheel slip values and the determination based on the transverse accelerations of the axles are combined with each other. If over-steered cornering has been detected, according to the present invention one or more measures supporting stability can be taken.

In the following single embodiments of the invention are described on the basis of the figures, whereby:

BRIEF DESCRIPTION OF THE DRAWINGS

FIG. 7 shows the qualitative development of different values.

DETAILED DESCRIPTION OF THE PREFERRED EMBODIMENTS

Figure 1:
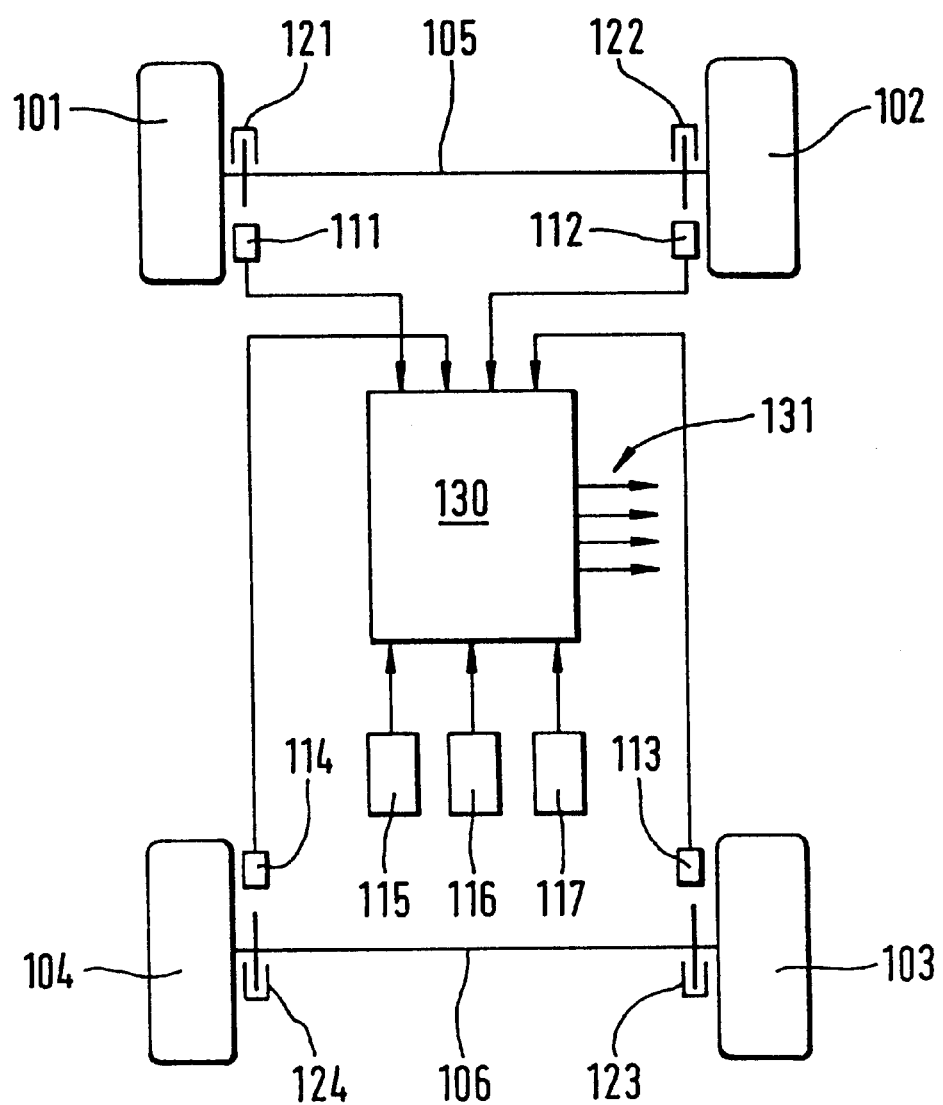
FIG. 1 shows schematically a vehicle in which the invention can be applied.
Figure 3:
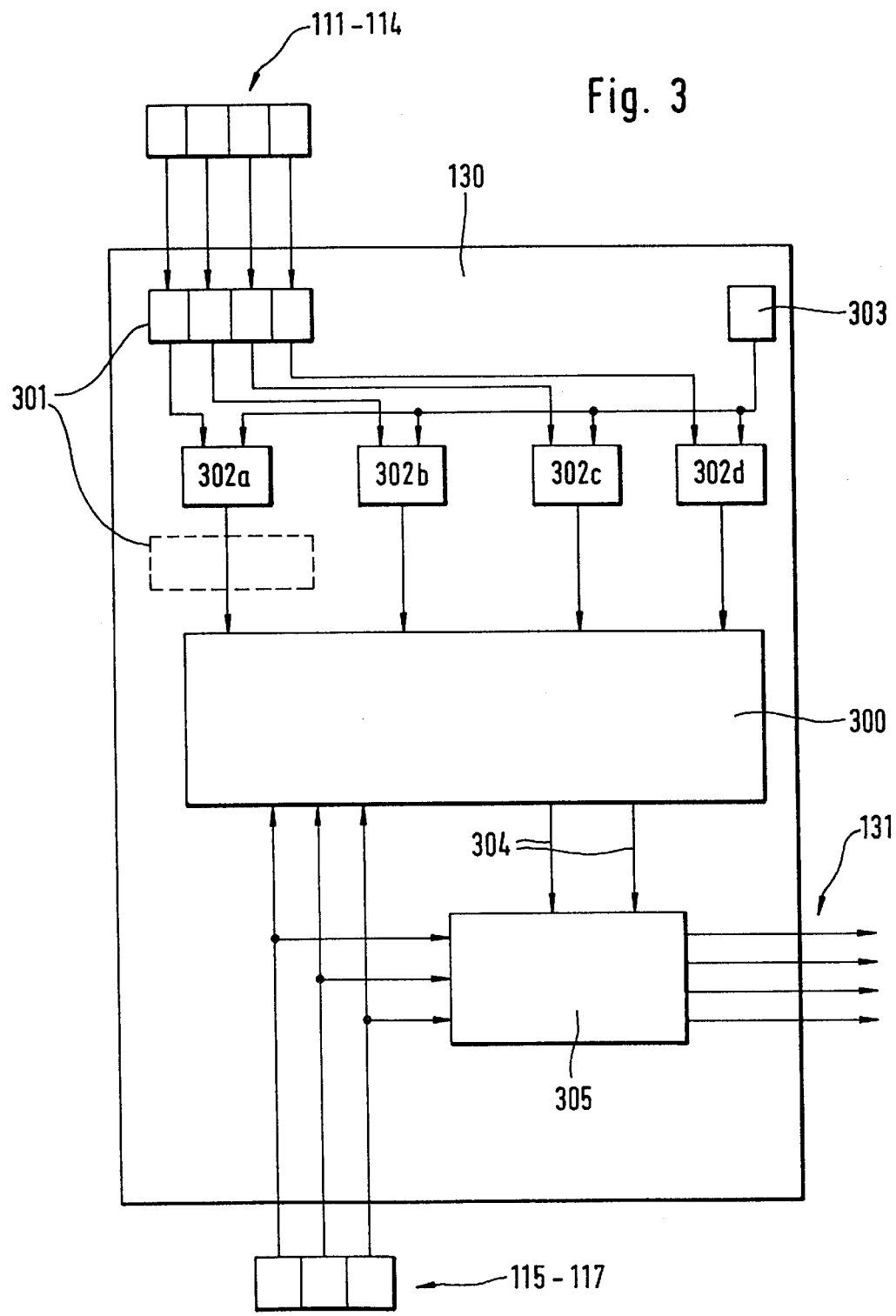
FIG. 3 shows an embodiment of a device for detecting a cornering maneuver.

FIG. 3 shows a device for detecting a cornering maneuver. The same reference numerals as in FIG. 1 indicate the same components. Reference numerals 111 to 114 are the wheel sensors that are designed in a block-type manner, but are, in fact, foreseen for each single wheel. They also correspond to a first detecting device.

Reference numerals 302a to 302d is a second detecting device with which the slip value is determined, preferably for all the wheels of the vehicle. It is the second detecting device that preferably receives a signal designating the vehicle speed, Vf. The signal representing the vehicle speed, Vf, is preferably determined and made available by a third detection device 303. The device may be another sensor or even a more complex elaboration device determining a signal, for example from the signals of the wheel sensors 111 to 114 by means of suitable strategies.

In the second detecting device 302a to 302d, the difference between the vehicle speed and the wheel speed can be determined for the single wheels so that the slip values for each wheel can be output.

Furthermore, suitable pre-processing or post-processing of the signals 301 can be foreseen. In general, the wheel sensors 111 to 114 provide a more or less high-frequency sequence of pulses. This can be processed in such a way that a (preferably digital) signal is generated which directly characterizes the wheel speed. In addition, filter functions can be implemented to possibly filter faults and fluctuations. For example, the averaging or integration over a certain period of time may be foreseen. Observation periods between 250 and 500 ms, and preferably between 280 and 350 ms, have resulted advantageous for the averaging or integration. The signal processing 301 can be foreseen at suitable points in the signal flow. Thus, for example, the signals coming from the wheel sensors 111 to 114 can be processed or filtered. In addition, the output signals of the second detecting device can be processed in such a way, as indicated by the dashed box below 302a.

Reference numeral 300 is a first detection device recognizing cornering with reference to several, preferably to all of the determined slip values. If a cornering maneuver is recognized, the device can output signals 304 that are received and further processed by other components/braking functions 305. The signals 304 are preferably shaped in such a way that the three cases "curve left", "curve right", and "no curve" can be distinguished. The first detection device 300, as well as the other components/braking functions 305, can further receive signals that are shown or not shown to be necessary for realization by signal processing. In the Figure, the reception of the external sensor signals 115 to 117 is represented. In addition, the wheel speed signals and other internal signals can be received.

The first detection device 300 recognizes a left curve, if one or more of the following conditions are met:

$Shl-S0 \geq Shr-S0$, $Svl-S0 > 0$ $Svr-S0 = 0$, and recognizes a right curve, if one or more of the following conditions are met at the same time:

$Shr-S0 \geq Shl-S0$, $Svr-S0 > 0$ $Svl-S0 = 0$,

Shl is the slip on the left-hand rear wheel, Shr is the slip on the right-hand rear wheel, Svl is the slip on the left-hand front wheel, Svr is the slip on the right-hand front wheel, and S0 is a slip correction value.

The first condition with one of the two conditions mentioned afterwards is preferably used for the left-hand or right-hand curve in order to recognize cornering in one direction. All three conditions are also preferably used for recognizing cornering in respectively one direction.

As already mentioned, the above mentioned conditions can be examined by means of integrated and averaged slip values with respect to time. It is in particular desirable that for detecting a left-hand curve, the integration period for the slip on the left-hand rear wheel is longer than the integration period mentioned above. The same applies with regard to the slip on the right-hand rear wheel for detecting a right-hand curve.

The slip correction value, S0, is a correction value eliminating small errors. For example, it can be determined as a fraction of the vehicle speed, Vf, and/or according to the transverse acceleration, Aq. The slip correction value, S0, is preferably between 0.1% and 1% of the vehicle speed, Vf, and also preferably between 0.4% and 0.6% of the vehicle speed, Vf The slip correction value, S0, can also depend on the transverse speed, Aq, as shown in FIG. 7, in a qualitative manner (S0 decreases with increasing Aq). Furthermore, it is pointed out, that S0 does not have to be the same, identical value for all the wheels or all the conditions. Rather, different slip correction values S0 can be used for different values or different conditions. In this case, a single variable was used only in order to simplify the representation.

If averaged/integrated values are used for examining the above-mentioned conditions, the slip correction value, S0, has to be adjusted in a suitable manner or to be included in the averaging/integration. Thus, the respective integral value considered would not only be defined by means of the considered slip value, but by means of the difference between slip value and slip correction value.

The first detection device 300 can consider a left-hand curve as completed, if one or both of the following conditions are met:

$Shl-S0 < Shr-S0$ $Shl-S0 = 0$ and consider a right-hand curve as completed, if at least one of the following conditions is met:

$Shr-S0 < Shl-S0$ $Shr-S0 = 0$

The considered values are defined as illustrated above.

The application of a slip correction value leads to the fact that only major values can lead to a detection. The comparison of the wheels of an axle, preferably of the axle which is not driven, that is used for detecting the curve is based on the finding that the wheel located toward the inner side of the curve shows slip values greater than or equal to the slip values of the wheel located toward the outer side of the curve. The other conditions serve for excluding disturbing conditions.

The curve recognition described above is preferably realized only if the vehicle is not braked. In this case, it is assured that the slip values that have been determined are those of a wheel rolling freely and are not falsified by the slip due to interventions of the brake. If the slip values are compared by axle, in general the slip values of the wheels on the non-driven axle are preferably used because in this case there can be no falsifications due to the slip produced by the vehicle drive.

With the method described above and the device suitable for realizing the method, it is possible to determine a curve in a reliable manner without having to use a steering angle sensor, yaw rate sensor or transverse speed sensor. The detection result output by the signal lines 304 of the first detection device 300 is transmitted to other components/braking functions 305 that can be braking functions in the broadest sense of the word, for example, ABS, braking assistance functions, or the like.

Figure 4:
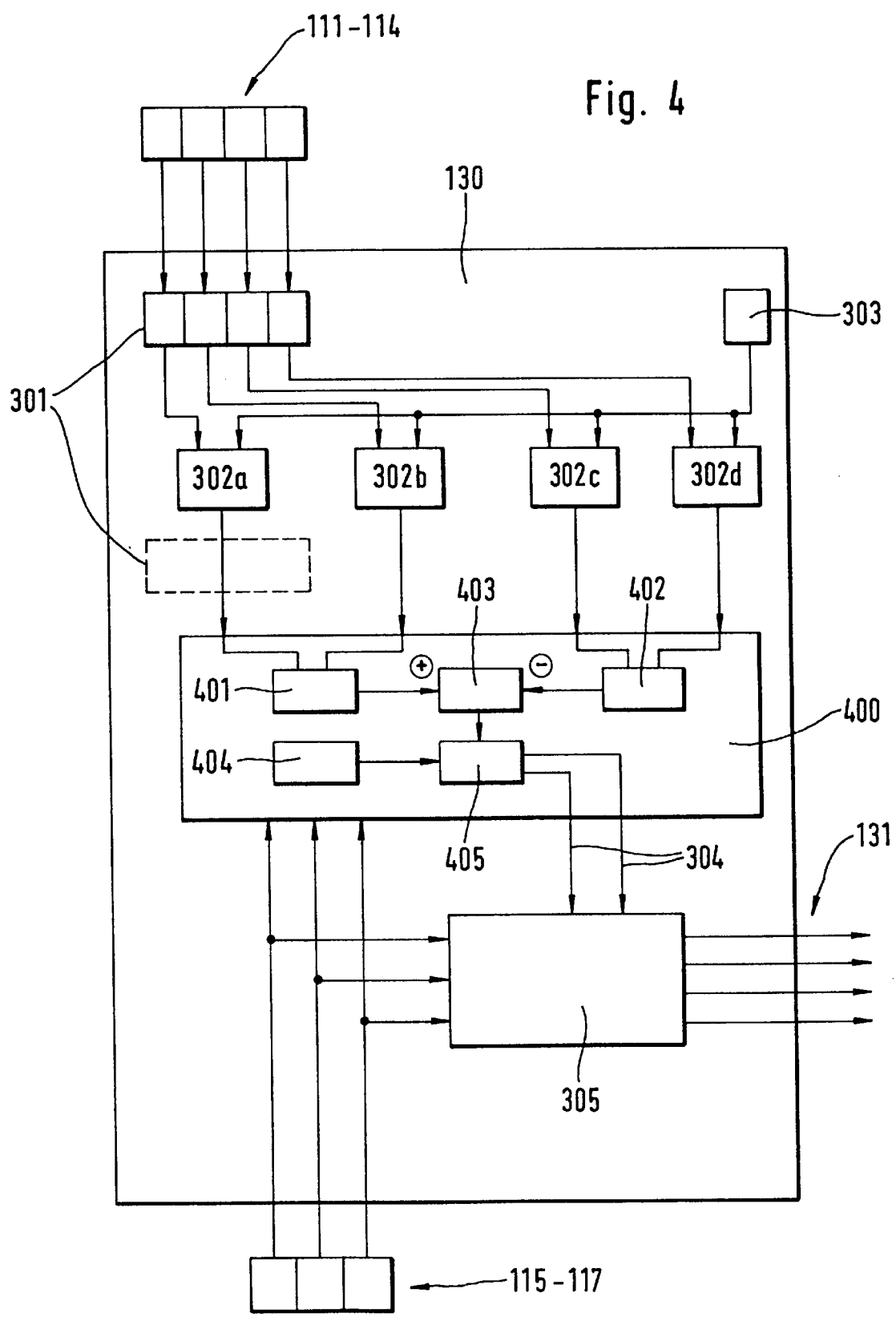
FIG. 4 shows a device for detecting over-steered cornering.

With regard to FIG. 4, a method for detecting over-steered cornering is described in a device for realizing the method. Identical reference numerals as in FIG. 3 indicate identical components with the same functions that are not described again in order to eliminate repetitions.

FIG. 4 shows a second detection device 400 detecting over-steered cornering with relation to several of the determined slip values. It can output signals 304 being formed as shown in FIG. 3. In other components/braking functions 305 of the control 130, the signals 304 can be considered in a suitable manner.

The second detection device 400 can detect over-steered cornering, if the condition $$Sh-Sv>a$$

is met, whereby Sh is a value describing the slip behavior on the rear axle, Sv is a value describing the slip behavior on the front axle and the value, a, is a safety value.

Sh can be determined with relation to at least one slip value, preferably with respect to the slip values of both wheels on the rear axle, for example, as an average value. The same applies analogously to the value Sv.

Over-steered cornering can be detected as completed, if at least the first, preferably more or all of the following conditions are met:

$$Sh-Sv<s$$

$$Sh-Sv>-s$$

$$Sha<Sva.$$

Sh and Sv are defined as above, Sha and Sva are the slip values of the front and rear wheels on the outside, respectively.

The condition used for detecting over-steered cornering is based on the finding that in case of over-steered cornering, the slip behavior of the rear axle due to different influences is bigger than that of the front axle, for example, reflected by the average slip of the wheels on this axle.

In order to exclude incorrect detections, the safety value, a, is introduced. Then an over-steered cornering is detected only if there is a major difference between the slip behavior on both axles. The safety value, a, can be a constant or determined according to the vehicle speed and/or according to the calculated or measured transverse acceleration, Aq. FIGS. 7b and 7c show the qualitative dependences for the safety value, a. Based on a lowest limit value for transverse acceleration, Aq, equal to 0, the safety value, a, may increase along with the transverse acceleration, Aq. In addition, the safety value, a, can decrease with increasing vehicle speed, Vf, towards a limit value.

The conditions for detecting, if an over-steered cornering maneuver is completed, are chosen in such a way that slip differences between front and rear axles that fall within a certain range, defined by a threshold value, s, are no longer considered as an over-steered cornering maneuver. The threshold value, s, can determined according to the vehicle speed, Vf, and amounts to values from 0.5% to 1% of the vehicle speed, Vf. The safety value, a, and the threshold value, s, are chosen with regard to each other in such a way that the result is a hysteresis-type behavior with regard to detecting an over-steered cornering maneuver.

The direction of the curves can be determined by other conditions, for example, by means of the device described in FIG. 3 or by a suitable sensor.

In FIG. 4, reference numerals 401 and 402 are devices for producing the average value with which the average of the slip values on the front axle or on the rear axle is determined. The difference is produced in device 403. In device 405, the difference is compared with the safety value a or the threshold value s, whereby the safety value a and the threshold value s are determined in device 404 according to further operating states.

The method described in FIG. 4 can be interrupted if the brake intervenes. In case of brake interventions, it is also possible to carry out the conditions above for detecting the over-steered cornering with reference to the slip values of the front and rear wheels located toward the outside of the curve. The value describing the slip behavior of an axle is no longer the average value, but a value based on the slip behavior of the wheel located towards the outside of the curve. This procedure is based on the finding that due to the rolling moment of the vehicle around its longitudinal axis in a curve, the wheels located towards the outside of the curve are stressed in a more intensive manner, and thus are subjected to a lower amount of slip due to the braking maneuver, therefore rarely presenting disturbed signals for the detection of the over-steered cornering according to the present invention. In an alternative embodiment of FIG. 4, the wheel speeds also can be used directly because the subtraction of the vehicle reference speed from the wheel speeds is eliminated in the difference 403. Therefore, the production of wheel slip values is only necessary to the extent that it is needed by other components or functions. Otherwise, it can be omitted.

Figure 2:
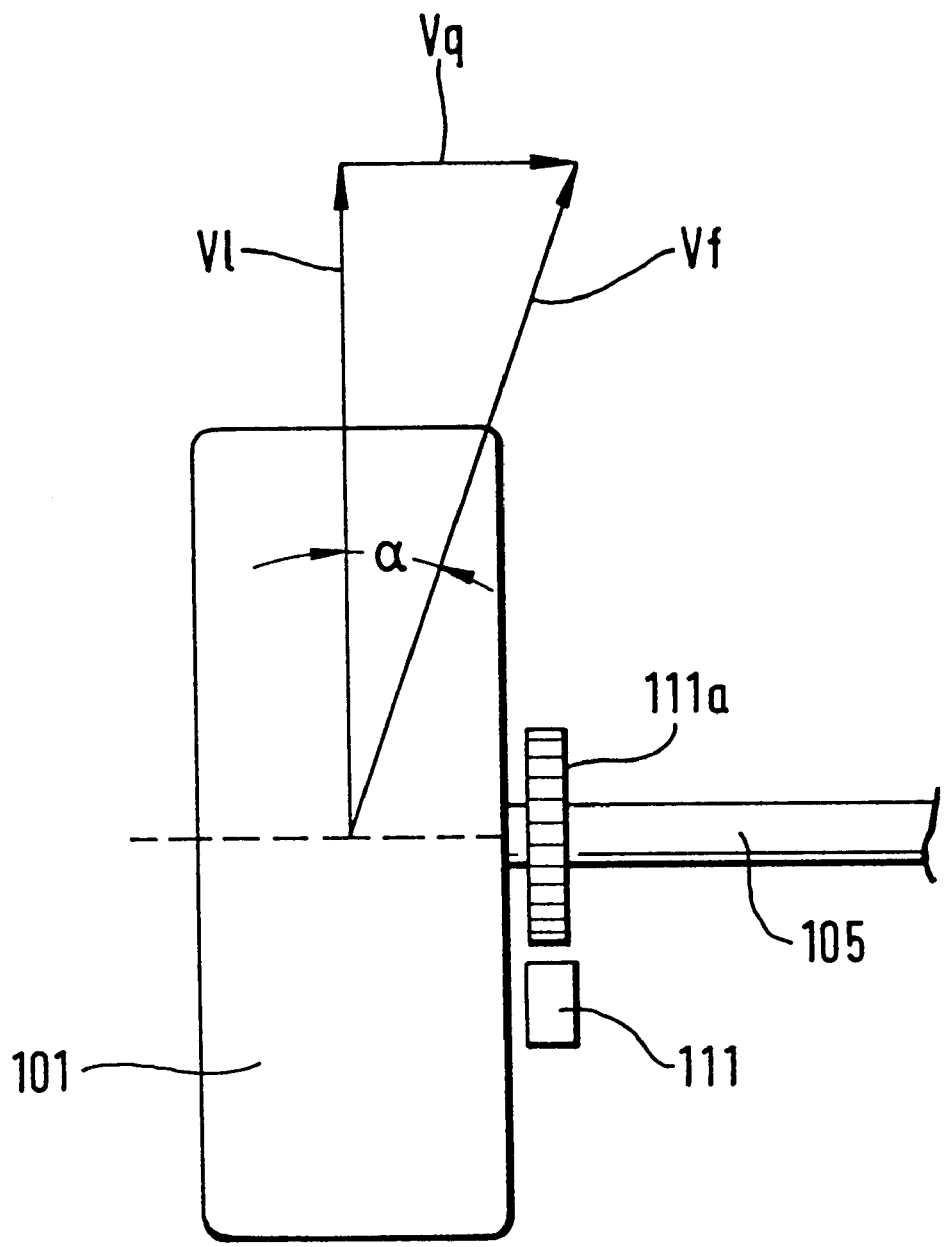
FIG. 2 shows a representation illustrating physical relationships.

The detection of over-steered cornering described above is based on the finding that the axial speed component Vq which is not detected increases according to $Vq=Vf \cdot \sin \alpha$ with increasing king pin inclination of the wheel ($\alpha$ in FIG. 2), while the longitudinal component Vl according to $Vl=Vf \cdot \cos \alpha$ detected in the wheel plane declines. Thus, the slip, for example, the difference (in absolute values) resulting between the vehicle speed Vf and the longitudinal component Vl is a measure for the king pin inclination so that it can be used for evaluating the over-steering behavior.

Up to now, the detection of an over-steered cornering maneuver has been described with reference to the slip values of the vehicle wheels, but instead of the slip values, the wheel speed values can also be used for the examination.

Figure 5:
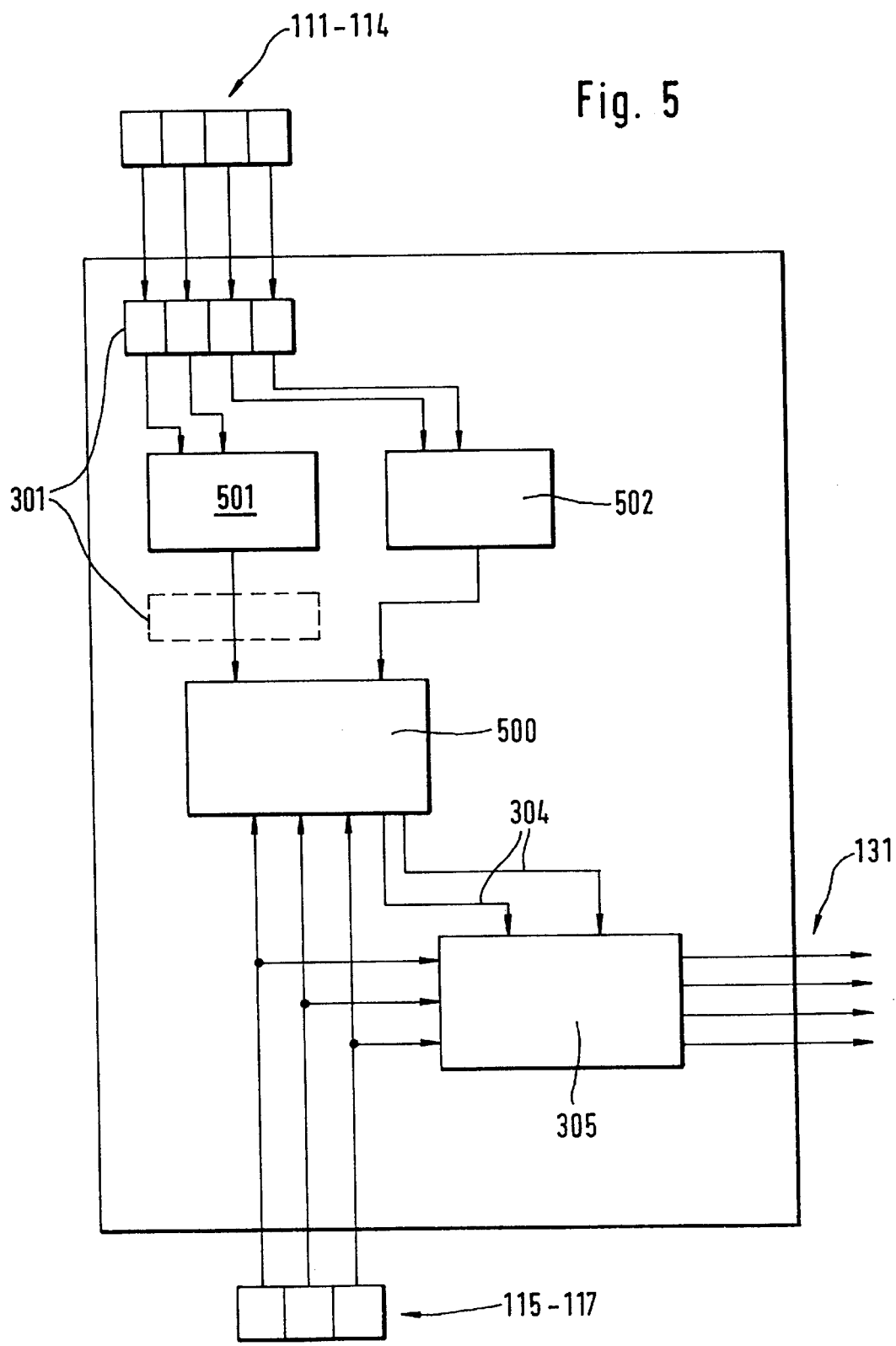
FIG. 5 shows another device for detecting over-steered cornering.

With regard to FIG. 5, another embodiment for determining over-steered cornering is described. The same reference numerals as in FIG. 3 indicate the same components that are not described for brevity.

The over-steered cornering maneuver of a vehicle can also be determined based on the transverse accelerations of the vehicle's axles, the transverse acceleration being the acceleration approximately in the direction of the radius of the curve, and thus, also approximately in the direction of the axle. The transverse acceleration, Aq, can be determined in approximation by equating the formula for the centrifugal force ($F=m \cdot v^2/r$) with the general formula for the force on a mass which is to be accelerated ($F=m \cdot a$). Thus, results $Aq=v^2/r$. Based on a more precise consideration of the geometric-relations in a curve, the transverse acceleration on an axle can be expressed by $$Aq=((Vr+Vl)(Vr-Vl))/(2d),$$

whereby, Vr is the wheel speed of the right wheel on the axle, Vl is the wheel speed of the left wheel on said axle and the value, d, is the track on the axle. Thus, the transverse acceleration on the axle can be determined with reference to the wheel speeds on the axle, the center of the axle being the mathematically exact point-of the determined transverse acceleration, which is a useful hypothesis for the purpose of the detection procedure that has to be described.

Furthermore, the finding is used that in case of an over-steered driving behavior, the transverse acceleration on the rear axle is generally-bigger than the transverse acceleration on the front axle.

Thus, the over-steered driving behavior can be determined by comparing the transverse acceleration of the rear axle with the transverse acceleration of the front axle. Over-steered cornering can be detected, for example, if the condition $$Aqha-Aqva>b$$

is met, Aqha is the transverse acceleration on the rear axle, Aqva is the transverse acceleration on the front axle and the value, b, is a safety value.

The safety value, b, is introduced into the conditions in order to separate accidental small deviations resulting from detecting inaccuracies, because these should not lead to the detection of an over-steered cornering. The safety value, b, can be in the range between 5% and 10% of the determined transverse accelerations Aq, but at least between 0.1 g and 0.2 g. FIG. 7d shows qualitatively the possible development of the safety value, b.

FIG. 5 shows a fourth detection device 501, 502 with which the transverse accelerations for the front and rear axles can be determined. These values are transmitted to the third detection device 500 that carries out the comparison, for example, based on the condition mentioned above. The signals 304 can be output as described above as a result of the detection. The determined transverse accelerations are preferably compared according to their absolute value. The direction of the curve can be determined by suitable further conditions or, for example, also by the method or the device according to FIG. 3. A sensor may be used too.

As already mentioned above, a suitable signal processing may be carried out at the beginning and/or for intermediate results, for example, the determined transverse accelerations, in order to detect the over-steered cornering maneuver according to the present invention. In FIG. 5, this is again indicated by reference numeral 301, whereby the indicated devices can be foreseen individually or in combination with each other.

The determination of over-steered cornering based on the transverse acceleration is particularly suitable for cornering with high transverse dynamics, that is, with high transverse acceleration. In this case, the transverse acceleration can, on the one hand, be calculated with a satisfactory accuracy. On the other hand, problems may arise due to the wheel slips when over-steered cornering is detected.

Figure 6:
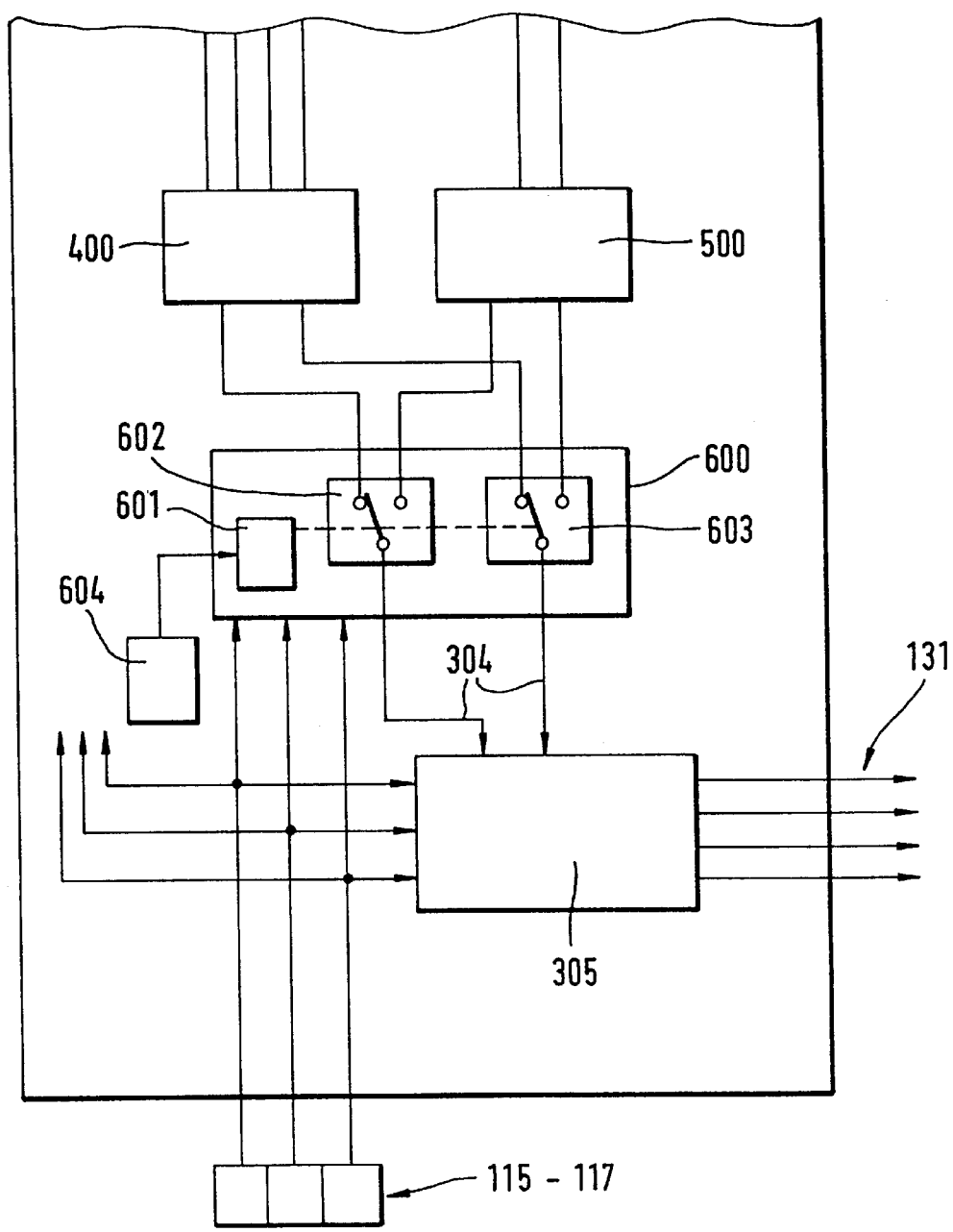
FIG. 6 shows another device for detecting over-steered cornering.

FIG. 6 shows an embodiment according to the present invention, in which the detections according to FIG. 4 and FIG. 5 are combined with one another, and represents the second detection device 400 of FIG. 4 detecting over-steered cornering with reference to the wheel slips and the third detection device 500 of FIG. 5 detecting over-steered cornering with reference to the transverse accelerations of the vehicle axles. The same components as in the corresponding position in FIG. 4 are located above the second detection device 400. The same applies analogously for the components above the third detection device 500. Resources that are required by both devices, for example, signal processors, do not need to be provided twice, but can be used in common.

Generally, the detection result of one of the two detection devices can be preferred or chosen. For this reason, a selection device 600 is foreseen choosing and transmitting either the detection result of the second detection device 400 or the detection result of the third detection device 500. The selection may be carried out according to further operating states of the vehicle. In particular, in case of a relatively low transverse acceleration or also in case of relatively small wheel slip values, the detection of the over-steered cornering with regard to the wheel slip values may be preferred or chosen. In the case of higher transverse accelerations or higher wheel slip values, the detection of over-steered cornering with reference to the transverse accelerations may be preferred.

FIG. 6 shows a device 604 producing a test value, the test value being produced according to the operating states of the vehicle mentioned above, and in particular according to the transverse accelerations and/or according to the wheel slips. In a comparison device 601 of the selection device 600, the test value can be compared with a threshold value. Based on the comparison, for example, the second detection device 400 or the third detection device 500 can be chosen. FIG. 6 shows the commutators 602, 603 choosing either two outputs at a time of the one or the other detection device and transmitting them, as described above, to the other components/brake functions 305.

The detection by combination of the methods described with reference to FIG. 6, as based on FIGS. 4 and 5, has the advantage that well adjusted detection procedures are chosen for single operative states of the vehicle. On the one hand, this permits the detection of over-steered cornering in a reliable manner, but on the other hand to avoid error detections in a reliable manner.

If over-steered cornering has been detected, as described above, different measures may be taken individually or in combination with each other.

A curve-outward moment acting around the vertical axis of the vehicle may be generated by reducing or building up the brake pressure with less force/speed (gradient) or a nominal value on one or more of the wheels located on the inner side of the curve. Then, the brake force on the wheel located on the outside of the vehicle increases so that also the curve-outward moment increases (or a curve-inward turning moment declines). This counteracts to the over-steering tendency (acting curve-inwardly).

The increase of the driving moment when towing the vehicle has a similar effect, especially on the rear axle. This also has a stabilizing influence counteracting the over-steering tendency.

Finally, it is possible to change in general the reaction thresholds for assistance functions. Subject to the fact whether the braking assistance functions have a positive or negative effect on over-steered cornering, the corresponding reaction thresholds may be reduced or increased so that the single functions are more sensitive or less sensitive. This helps inducing favorable influences from higher braking assistance functions and avoiding unfavorable influences.

The intervention possibilities described above may be carried out in the other components/braking functions 305 according to the signals 304. They influence the output signals 131 that influence the driving behavior of the vehicle.

What is claimed is:

1. Method for detecting a cornering maneuver of a vehicle, comprising the steps of:

determining wheel speeds of several wheels based on wheel speed signal values and determining slip values of these wheels, and detecting cornering with reference to several of the determined slip values, wherein at least one of the wheel speed signal values and the slip values are averaged or integrated over a minimum period of time between 250 and 500 ms.

2. Method according to claim 1, further including determining a vehicle speed and wheel slip based on the wheel speed of said wheel.

3. Method according to claim 1, further including detecting a braking event.

4. Method according to claim 1, further including the steps of:

detecting a left curve if one or more of the following conditions are met:

$Shl-S0>=Shr-S0,$ $Svl-S0>0,$ $Svr-S0=0,$ and detecting a right curve if one or more of the following conditions are met:

$Shr-S0>=Shl-S0,$ $Svr-S0>0,$ $Svl-S0=0,$

Shl is the slip on the left rear wheel,
   Shr is the slip on the right rear wheel
   Svl is the slip on the left front wheel
   Svr is the slip on the right front wheel, and
   S0 is a slip correction value.

5. Method according to claim 4, wherein the slip value is determined subject to a vehicle speed.

6. Method according to claim 5, wherein the slip value is a value between 0.1% and 1.0% of the vehicle speed.

7. Method according to claim 1, further including the steps of:

determining that a left curve is completed, if at least one of the following conditions is met:

$Shl-S0<Shr-S0,$ $Shl-S0=0,$ and determining that a right curve is considered as completed, if at least one of the following conditions is met:

$Shr-S0<Shl-S0,$ $Shr-S0=0,$

Shl is the slip on the left rear wheel,
   Shr is the slip on the right rear wheel, and
   S0 is a slip correction value.

8. Device for detecting a cornering maneuver of a vehicle, comprising:

a first detection device for determining wheel speeds of several wheels, and a second detecting device for determining slip values of said wheels, a first detecting device for determining cornering with reference to several of the determined wheel slip values, and a device for producing an average value or an integral value of the wheel speed values or slip values, the averaging or integration being carried out over a minimum period of time between 250 and 500 ms.

9. Device according to claim 8, wherein the vehicle speed is determined by a third detection device and wherein the second detecting device determines the slip of a wheel based on a vehicle speed and the wheel speed of said wheel.

10. Device according to claim 8, further including an interrupting device which interrupts a cornering detection if a brake event occurs.

11. Device according to claim 8, wherein the first detection device detects a left-hand curve, if one or more of the following conditions are met:

$Shl-S0>=Shr-S0,$ $Svl-S0>0,$ $Svr-S0=0,$ and wherein the first detection device detects a right-hand curve, if one or more of the following conditions are met:

$Shr-S0>=Shl-S0,$ $Svr-S0>0,$ $Svl-S0=0$

Shl is the slip on the left rear wheel,
   Shr is the slip on the right rear wheel,
   Svl is the slip on the left front wheel,
   Svr is the slip on the right front wheel, and
   S0 is a slip correction value.

12. Device according to claim 8, wherein the first detection device considers a left-hand curve as completed, if at least one of the following conditions is met:

$Shl-S0<Shr-S0;$ $Shl-S0=0$ and wherein the first detection device considers a right-hand curve as completed, if at least one of the following conditions is met:

$Shr-S0<Shl-S0$ $Shr-S0=0,$

Shl is the slip on the left rear wheel,
   Shr is the slip on the right rear wheel, and
   S0 is a slip correction value.

13. Device according to claim 8, further including a device for determining a slip correction value subject to a vehicle speed.

* * * * *